United States Patent [19]

Négrin

[11] 4,098,003
[45] Jul. 4, 1978

[54] DISTORTION DETECTION DEVICE, NOTABLY FOR MOTOR VEHICLE FRAMES

[75] Inventor: Gilbert Négrin, Cloyes-sur-le-Loire, France

[73] Assignee: Celette S.A., Vienne, Vienne, France

[21] Appl. No.: 797,926

[22] Filed: May 18, 1977

[30] Foreign Application Priority Data

Nov. 23, 1976 [FR] France ............................ 76 35194

[51] Int. Cl.² ...................... G01C 15/12; G01B 11/26
[52] U.S. Cl. ............................... 33/288; 33/180 AT; 33/193; 33/228; 33/286
[58] Field of Search .......... 33/286, 288, 193, 180 AT, 33/181 AT, 228

[56] References Cited

U.S. PATENT DOCUMENTS

| | | | |
|---|---|---|---|
| 2,481,420 | 9/1949 | Hanson | 33/288 |
| 2,575,194 | 11/1951 | Smith | 33/288 |
| 2,581,021 | 1/1952 | Jocobsen et al. | 33/288 |
| 3,869,804 | 3/1975 | Friend | 33/288 |
| 3,983,635 | 10/1976 | Jarman | 33/288 |
| 4,015,338 | 4/1977 | Kunze et al. | 33/288 |

Primary Examiner—William D. Martin, Jr.
Attorney, Agent, or Firm—Michael J. Striker

[57] ABSTRACT

This device for detecting possible distortions in a frame or in the base of a chassis-cum-body of a motor vehicle or other frame structures comprises a pair of carriages slidably mounted on rigid support members, each carriage having pivotally and separately mounted thereon a pair of arms carrying measuring rods at their outer ends, each arm being rigid with a toothed wheel so that the toothed wheels of each pair of arms mesh with each other and the arms constantly form symmetrical angles, like the two legs of a compass, irrespective of their positions, in relation to the longitudinal center line of the device which, for checking the presence of possible distortions in the frame or body base, is caused to register with the longitudinal center line of the frame or body base, whereby the measuring rods may be caused to register with predetermined reference points of the frame or body base. A tape-measure disposed between the two carriages affords an easy reading of the distance therebetween, and drive means are provided for moving the carriages to their proper checking positions.

9 Claims, 6 Drawing Figures

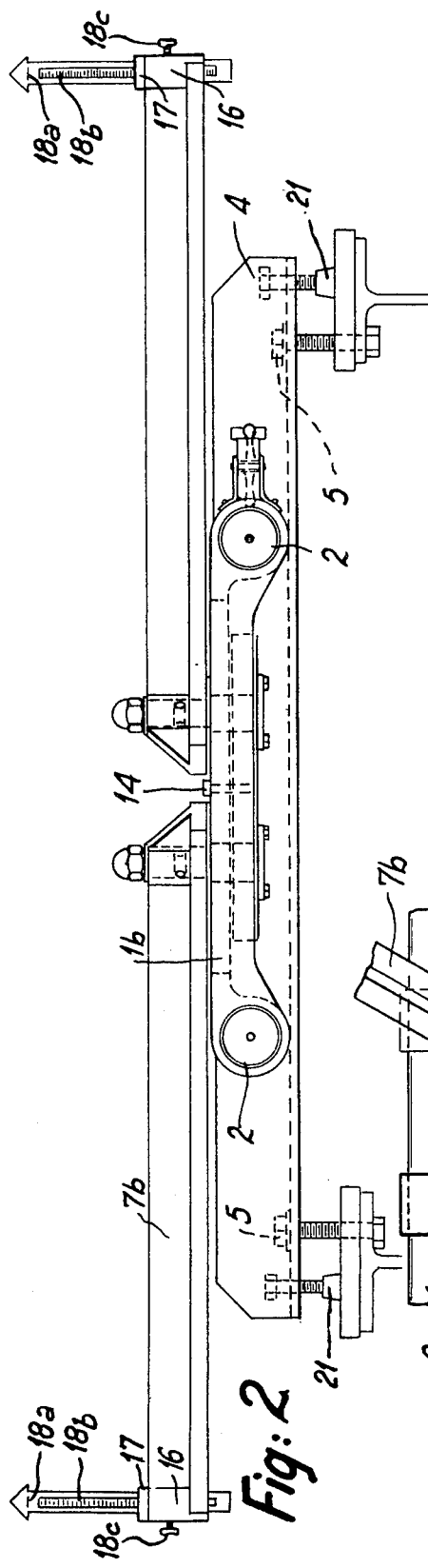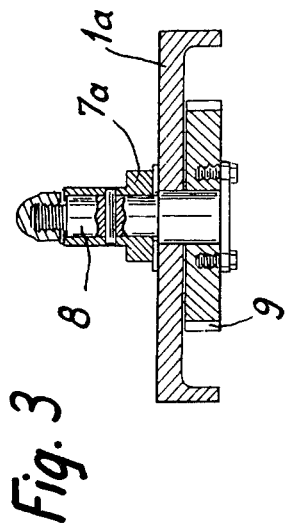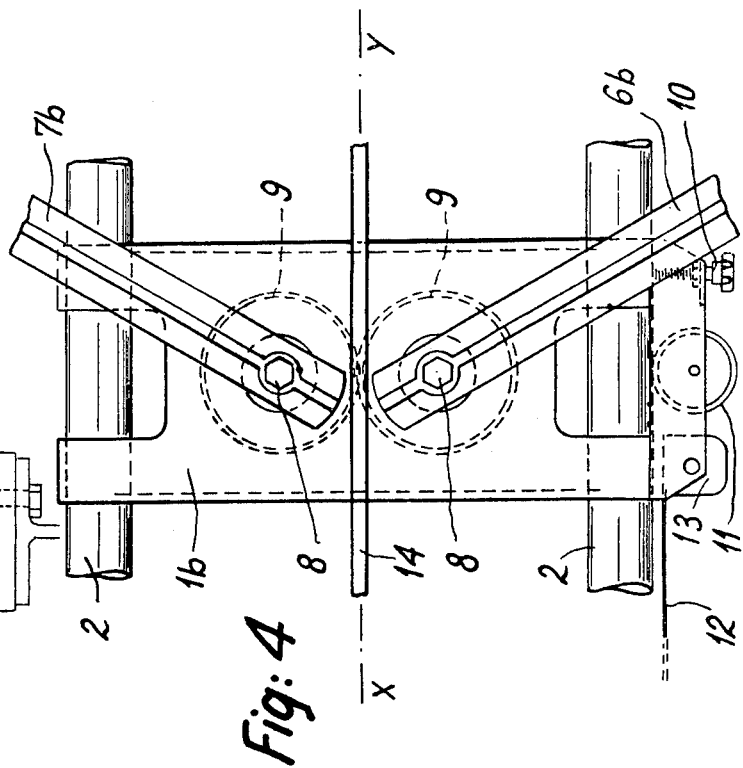

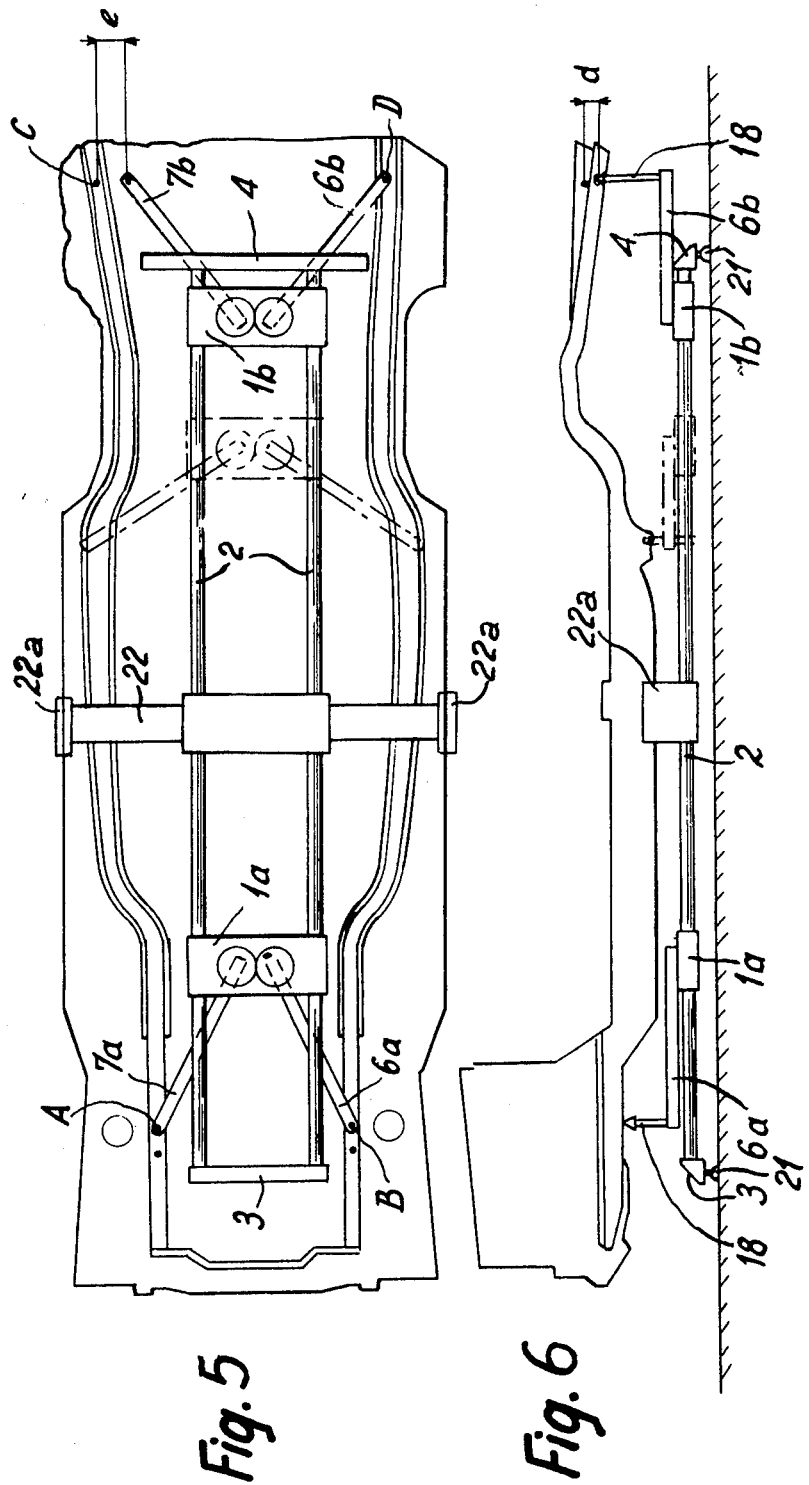

DISTORTION DETECTION DEVICE, NOTABLY FOR MOTOR VEHICLE FRAMES

BACKGROUND OF THE INVENTION

1 Field of the Invention

The present invention relates in general to devices and apparatus for detecting the possible distortion of a frame, chassis or like structure, such as the chassis or body of a motor vehicle.

2. Description of the Prior Art

Nowadays, for checking a chassis or body of motor vehicle in view of determining the presence of possible distortions, the ususal procedure consists in using a set of graduated rules and check rods for making a complete range of measurements. Thus, the precise positions of a number of predetermined reference points are checked in relation to one another. For this purpose, most car manufacturers provide a series of well-defined reference check points sometimes made visible by the presence of holes in the frame or the bottom surface of the car body. However, it is also possible to use as reference points the locations contemplated initially for mounting certain component elements of the vehicle, such as the wheel support members or the shock absorber fixation points.

However, a relatively great number of checking and measuring opertions are thus required and imply a considerable loss of time. Besides, these various operations are rather tedious even for skilled personnel.

DESCRIPTION OF THE INVENTION

It is therefore the primary object of the present invention to provide a distortion detecting device affording an extremely easy and rapid detection or ascertainment of possbile distortions having occurred in a chassis or frame or in a framecum-body structure of a motor vehicle by checking specific and predetermined reference points disposed symmetrically in relation to the longitudinal center line of the tested chassis, frame or body.

For thus purpose, this device comprises a pair of carriages slidably mounted on a pair of fixed longitudinal parallel side members extending horizontally on either side of the longitudinal center line of the chassis or like structure to be checked, each carriage having pivotally mounted thereon a pair of horizontal arms constituting so to say the two legs of a compass and adapted to carry at their outer ends vertical measuring rods adapted to have their pointed ends normally so positioned as to register with a pair of symmetrical points to be checked, said pair of arms being interconnected by mechanical means such as a pair of toothed wheels meshing with each other and adapted to constantly maintain said arms in symmetrical angular positions to each other.

Thus, with this device it is possible to check very rapidly several groups of predetermined reference points having originally a perfect symmetry in relation to the longitudinal center line of the structure to be tested for possible distortions. If this symmetry is not found with device, this proves that the chassis, frame or the sub-structure of the tested vehicle has undergone a distortion. Now the value of this distortion can be ascertained very easily and accurately by measuring the distance between the reference point involved and the check rod that should normally register therwith.

Furthermore, it will be seen that with this improved device it is possible to check the existence of distortions both vertically and transversely. Besides, other features and advantages of this invention will appear as the following description proceeds with reference to the attached drawing illustrating a typical and preferred form of embodiment thereof, given by way of example, not of limitation.

BRIEF DESCRIPTION OF THE DRWING

FIG. 2 is a cross-sectional view taken along the line II—II of FIG. 1;

FIG. 3 is a fragmentary section taken along the line III—III of FIG. 1 and showing a detail on a larger scale;

FIG. 4 is a plan view from above showing on a larger scale one of the sliding carriages of the device;

Figure 1:
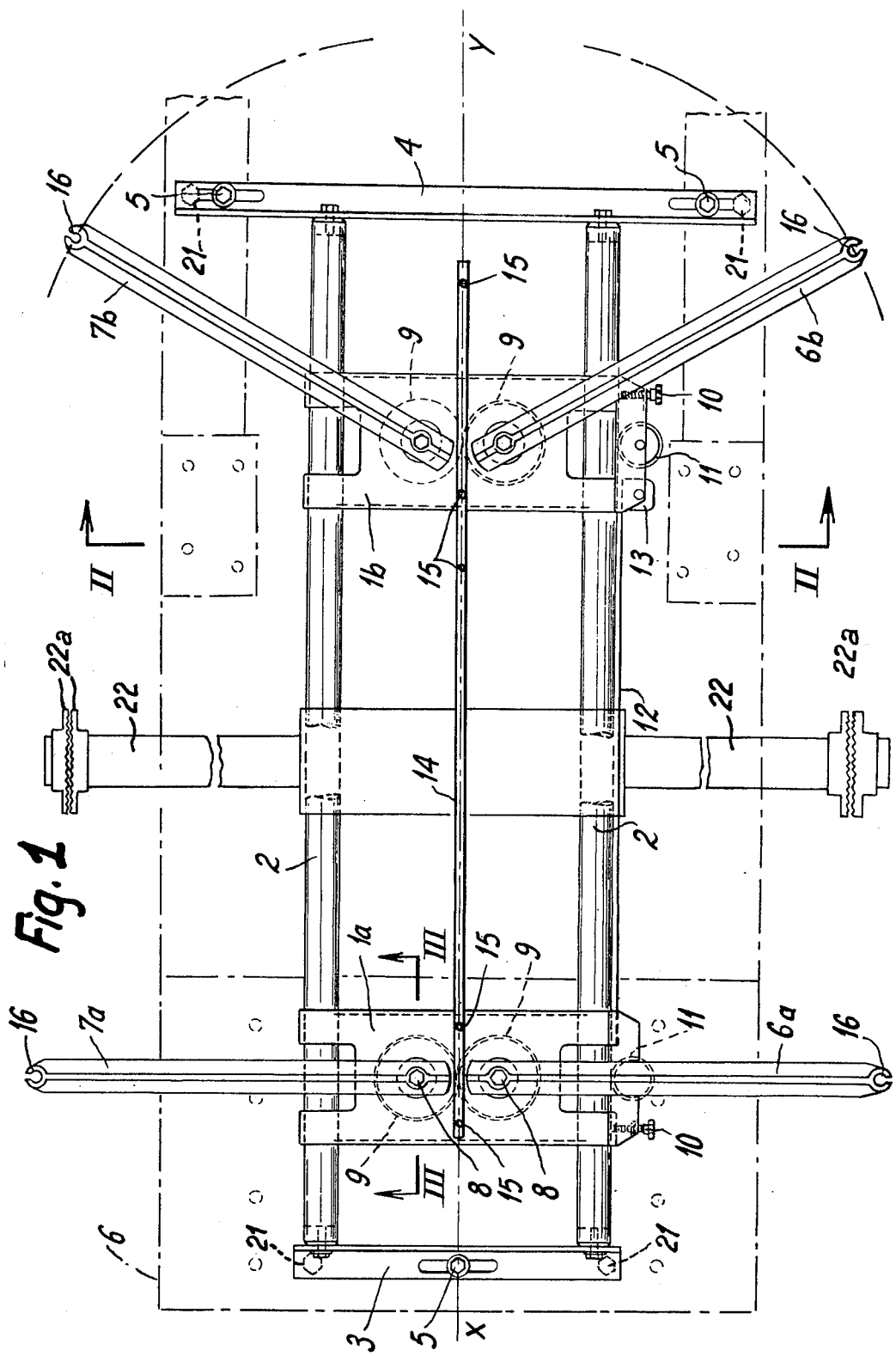
FIG. 1 is a plan view from above of the improved distortion detecting device according to this invention.

FIG. 5 is a plan view from beneath illustrating diagrammatically the method of utilizing the device of this invention for detecting possible distortions in the chassis of a motor vehicle across the longitudinal center line thereof, and FIG. 6 is a diagrammatic side elevational view illustrating the use of the same device for detecting possible distortions of the same chassis in the vertical direction.

DESCRIPTION OF THE PREFERED EMBODIMENT

As already explained in the foregoing, the distortion detection device according to this invention comprises two carriages 1a, 1b slidably mounted on a pair of parallel longitudinal members 2 consisting of a pair of metal tubes having their ends interconnected by L-sectioned cross members 3, 4. As illustrated in FIG. 1, these cross members 3, 4 may be secured by means of bolts 5 to a bench, or surface plate, 6 adapted to receive the frame, chassis or body to the checked. However, this device may also be placed directly on the floor, as illustrated in FIG. 6, or secured to suitable support means. In either case, adjustment screws 21 bearing on the supporting surface are provided for adjusting the horizontality of the frame structure comprising the longitudinal members 2 and cross members 3, 4, to prevent any warping thereof.

Each carriage 1a, 1b carries a pair of pivotally mounted horizontal arms 6a, 7a and 6b, 7b, respectively. The two arms of a same carriage are mounted on a pair of spaced pivot pin 8 rotatably mounted in bearings provided in the relevant carriage, on either side of the longitudinal center line X Y of the device. Each pivot pin 8 carries an integral toothed wheel 9 and the two wheels of a same pair of arms mesh with each other, the arrangement being such that the corresponding pair of arms constantly assume symmetrical angular positions in relation to the longitudinal center line X Y.

Both carriages 1a and 1b are adapted to slide smoothly and without any play on the pair of parallel tubes 2. Each carriage incorporates a set screw adapted to engage with its tip the corresponding tube 2 for retarding the movement of the carriage, or stopping the latter in the desired position. The movements of translation of each carriage may be controlled by means of a manual drive wheel 11 rotatably mounted on the carriage and having its outer periphery or rim lined with resilient material engaging the corresponding tube 2. If desired, these control wheels 11 may be remote-controlled through mechanical or electric-power drive means.

The two carriages are coupled through a measuring system whereby their relative distance can be read at any time. This system may consist simply of a tape measuring device such as a coil-tape double meter 12 having its case 13 secured to one carriage, in this example carriage 1b, the outer end of the tape being attached to the other carriage. However, a set of graduated rules 14 permitting of disposing the two carriages at predetermined relative spacings is provided for checking several groups of reference points located at either ends of the frame, chassis or body of a given vehicle. For this purpose, each graduate rule comprises a plurality of holes 15 adapted to be engaged by studs projecting from the top of both carriages 1a and 1b. Of course, each rule 14 corresponds to a predetermined vehicle type or model so that the two carriages can be set readily in the various desired positions for checking the different groups of reference points corresponding to this specific vehicle.

To perform this checking operation the pivoting arms 6a, 7a and 6b, 7b carry at their outer ends a longitudinally split vertical sleeve 16 engageable by a movable fastening socket 17 surrounding a sliding rod 18 adapted to act as a check member. Of course, several series of such rods 18 are provided, the rods of each series having different lengths to permit the proper checking of the various reference points of a same vehicle, or the various reference points of a same vehicle, or the various reference points of several vehicles of a given type.

In operation, for checking the frame or the base or bottom of a chassis-cum-body vehicle by means of the device of the present invention, the vehicle is brought to a position in which it overlies the device secured to the floor. The body is fastened in position by clamping the lower edges thereof by means of two pairs of jaws 22a carried by the outer ends of a cross bar 22 rigidly secured to the pair of longitudinal side member 2. This cross bar 22 actually consists of a pair of telescopic sections permitting of adjusting the width thereof as a function of the width of the body to be checked.

Then, one of the carriages, for instance carriage 1a, is brought to the desired position for checking two reference points A and B (FIG. 5) located symmetrically in relation to the longitudinal center line of the vehicle, at the corresponding end thereof. The measuring rods 18 carried by the outer ends of the two pivoting arms 6a and 7b should register accurately with the aforesaid reference points A and B. To obtain this perfect registration, the two arms 6a and 7a are pivoted like the legs of a compass. The rods 18 secured to the outer ends of these arms describe circular arcs centered to the axes of the relevant pivot pins 8.

Due to the mechanical coupling provided between these two arms, in the form of the meshing pinions 9, the arms 6a and 7a constantly form equal angles on either side of the longitudinal center line X Y of the device.

Thus, when the ends of arms 6a and 6b register exactly with said reference points A and B, the longitudinal axis of the device is also coincident with the corresponding center line of the vehicle. Then, the two reference points C and D located at the opposite end of the vehicle can be checked by means of the pair of pivoting arms 6b and 7b of carriage 1b. If the chassis 20 being checked is free of any distortion at this location, the measuring rods 18 secured to the outer ends of arms 6b and 7b will compulsorily register with the two points C and D when these arms are pivoted accordingly. However, if as illustrated in FIG. 5 the rod 18 carried by the outer end of one of these two arms, in this case arm 7b, does not register with the corresponding reference point C, while the rod carried by the other arm actually registers with reference point D, it is obvious that a distortion took place in the chassis at that end of the vehicle. The magnitude of this distortion may be ascertained by simply measuring the distance e between the end of arm 7b and the reference point C, while the end of arm 6b registers with the corresponding reference point.

With the device of this invention it is possible to check successively several groups of reference points disposed symmetrically on either side of the longitudinal axis of the vehicle. As already mentioned in the foregoing, these reference points may be those contemplated originally by the car manufacturer and consisting for example of holes drilled or punched in the frame or in the bottom structure of a chassis-cum-body vehicle. However, these reference points may also correspond to the points of fixation of certain well-defined components, such as wheel supports, shock-absorbers, etc.

Due to the provision of the tape-measure 12, the operator can read at any time the distance existing between the two carriages 1a and 1b, and thus bring these two carriages to the desired positions, respectively. Besides, a rule 14 provided with small holes 15 corresponding to the various successive positions in which the two carriages 1a and 1b are to be set may also be used, these holes being adapted to be engaged by studs carried by each carriage.

The combined movements of the two carriages and of the pivoting arms mounted thereon permit of checking simultaneously four reference points forming together diagonal lines of equal length. If these diagonals have unequal lengths, the operator may infer that the frame, chassis or bottom structure of the body to be checked has undergone a distortion. If he holds a dimensioned sketch concerning a number of reference points, the dimensions may be preset on check rods 18 with the assistance of any suitable electric or electronically-operated system, so that a direct checking can be made. Conversely, by causing the rods to register with the points to be checked, reading the corresponding measurements enables the operator to determine the practical dimensions of the corresponding vehicle.

As illustrated in FIG. 6, the present device is also adapted to check vertical distortions. For this purpose, it is advisable to use measuring rods 18 having a well-defined height so as to normally register with the points to be checked. If this registration is not obtained and a difference d is observed in the vertical direction, the operator may infer that a distortion exists in this direction.

From the foregoing it will readily appear to those conversant with the art that any distortions in the frame or in the bottom of a chassis-cum-body of a motor vehicle can be detected easily and rapidly. The device may be secured to a checking surface-plate, as illustrated in FIG. 1. However, it may also be laid flat on the floor as illustrated in FIG. 6, under the vehicle to be checked. The vehicle itself may be lifted by means of a hydraulic lift. On the other hand, the vehicle may be brought on the spot by means of a fork-lift truck.

Of course, this device should not be construed as being strictly limited by the specific form of embodiment shown and described herein by way of illustration. Thus, the device may comprise drive means enabling the two carriages 1a and 1b to be moved in one or the other direction. Other drive means may be contemplated for pivoting the pair of arms mounted on each carriage to the desired angular position. Besides, other means may be contemplated for mechanically interconnecting the two arms of each carriage, provided that symmetrical angular positions of these two arms are obtained in all cases.

Instead of several measuring rods 18 having different lengths, the device may be equipped with plain rods 18a mounted for sliding vertical movement in the pivoting arms and associated with graduated rules 18b, a set screws 18c being provided for holding each rod at the desired height. In certain cases, plumb-bobs suspended from the points to be checked and of which the lower pointed ends are to contact the ends of the corresponding movable arms 6a, 6b, 7a or 7b may be provided. Alternatively, spot lights may be used for projecting a pin-point light beam on a target or the like carried by the outer end of each arm.

In the example illustrated in the drawing the two carriages 1a and 1b are supported by a frame consisting essentially of a pair of parallel longitudinal members 2. However, these carriages could as well be slidably mounted on any other suitable support, for example a single central or axial beam.

Of course, direct-display or direct-reading systems, or any other suitable reading systems, may be associated with the device of this invention.

What is claimed as new is:

1. Device for detecting a possible distortion in a given structure by checking predetermined reference points of said structure which are disposed symmetrically in relation to the longitudinal center line of said structure, comprising in combination a support adapted to be disposed horizontally beneath the structure to be checked by causing the longitudinal center line of said support to register with the longitudinal center line of said structure, a pair of carriages slidably mounted on said support, a pair of horizontal arms pivotally mounted on each carriage and forming somewhat the two arms of a compass, mechanical means interconnecting the two arms of each carriage and adapted constantly to keep said two arms in a symmetrical angular position in relation to said longitudinal center line, and means adapted to be fitted to the outer ends of said compass arms for checking predetermined reference points provided on said structure.

2. Device as recited in claim 1, wherein the pair of pivoting arms of each carriage are carried by a pair of pivot pins disposed on either side of the longitudinal center line of the support, the mechanical means interconnecting said arms of each pair consisting of a pair of meshing toothed wheels each carried by one arm of the pair.

3. Device as recited in claim 1, wherein said check means adapted to be fitted to the outer ends of said arms on each carriage consist of detachable vertical rods, the device comprising several interchangeable sets of rods having different lengths.

4. Device as recited in claim 3, wherein said rod adapted to be fitted to the outer ends of said arms on each carriage are mounted for vertical sliding movement on said outer ends and associated with graduated rules for facilitating their useful height.

5. Device as recited in claim 1, wherein a measurement means is provided for setting the two carriages at the desired relative distance from each other.

6. Device as recited in claim 5, wherein said measurement means comprises a tape-measure such as a double-meter tape of which the case is carried by one of the carriage while the free end of the tape is attached to the other carriage.

7. Device as recited in claim 1, wherein a set of several rules each adapted to position the two carriages in a series of different positions are provided for checking several groups of reference points on the structure, each rule corresponding to a predetermined type of the structure to be checked.

8. Device as recited in claim 1, wherein each carriage comprise drive means and braking and locking means, said drive means consisting of a rotary wheel held in frictional driving contact with one of the longitudinal members of the device.

9. Device as recited in claim 1, wherein the support of the two carriages consists of a flat frame comprising a pair of parallel spaced longitudinal members on which said carriages are slidably mounted, said pair of parallel spaced longitudinal members being interconnected by cross members at either ends.

* * * * *